Sept. 12, 1967     F. D. WERNER ETAL     3,341,835
ICE DETECTOR
Filed Nov. 5, 1964     2 Sheets-Sheet 1
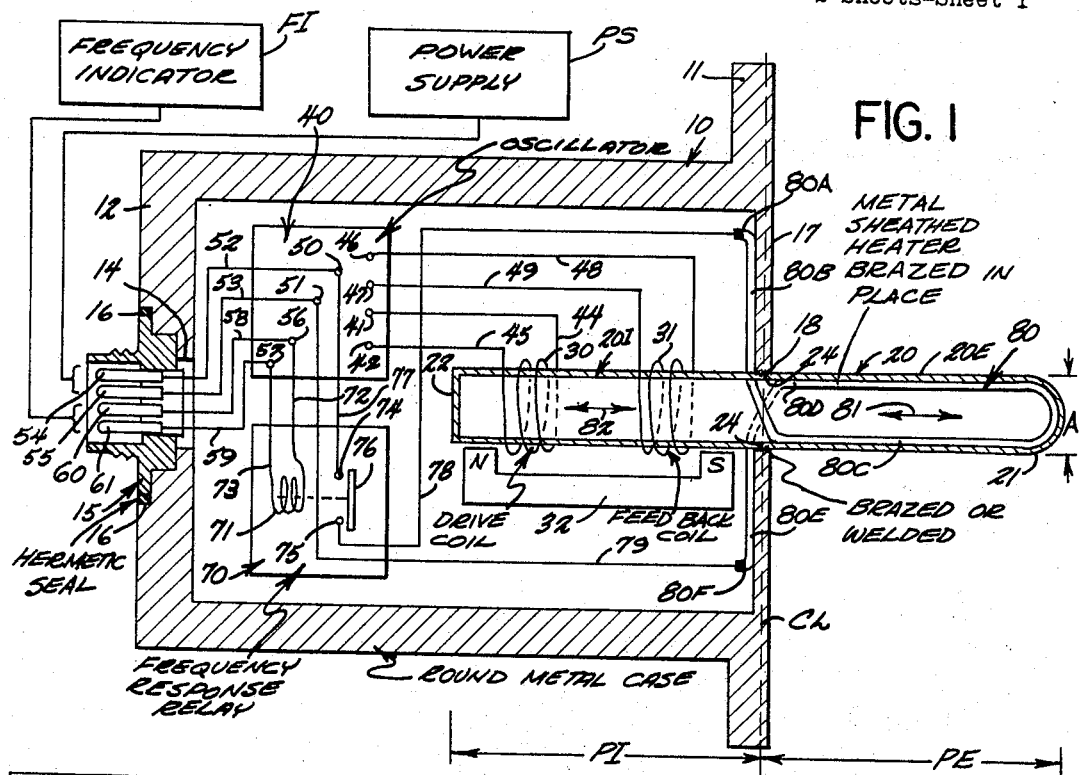
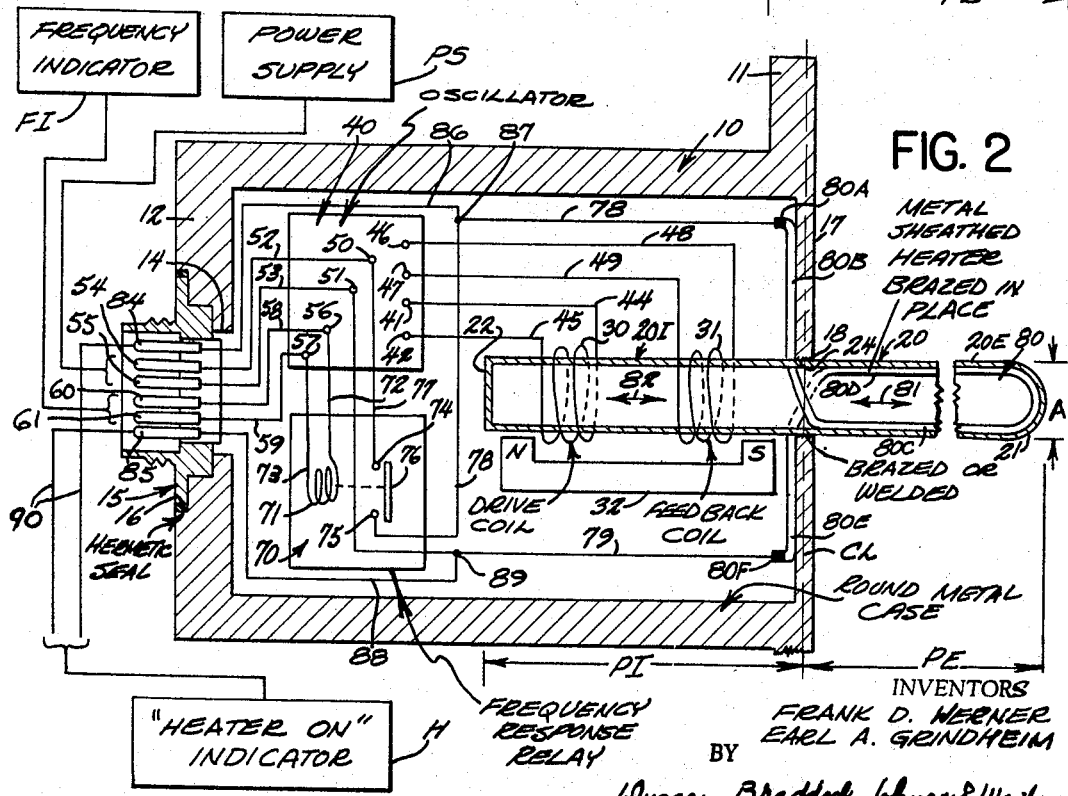
INVENTORS
FRANK D. WERNER
EARL A. GRINDHEIM
BY Dugger, Braddock, Johnson & Westman
ATTORNEYS Sept. 12, 1967     F. D. WERNER ET AL     3,341,835
ICE DETECTOR Filed Nov. 5, 1964     2 Sheets-Sheet 2

INVENTORS
FRANK D. WERNER
EARL A. GRINDHEIM
BY Dugger, Braddock, Johnson + Westman

ATTORNEYS

United States Patent Office 3,341,835
Patented Sept. 12, 1967

3,341,835
ICE DETECTOR
Frank D. Werner and Earl A. Grindheim, Minneapolis, Minn., assignors to Rosemount Engineering Company, Minneapolis, Minn., a corporation of Minnesota
Filed Nov. 5, 1964, Ser. No. 409,115
26 Claims. (Cl. 340—234)

This invention relates to ice detectors for use with aircraft and in any other locations where the detection of ice is of importance. The invention relates more particularly to an ice detector utilizing a vibrating system.

It is an object of the invention to provide an improved form of ice detector and more particularly to provide an improved form of vibrating ice detector. It is another object of the invention to provide an ice detector of exceedingly rugged construction which may be used in all manner of aircraft, helicopters, land locations, etc. It is a further object of the invention to provide an improved form of ice detector which is impervious to air, moisture, dust, vibration, variations in changing atmospheric conditions and temperature and which will resist losing its effectiveness with aging. It is still another object of the invention to provide an improved ice detector having a low level of error due to variations in temperature and which does not require significant temperature compensation. An additional object of the invention is to provide an ice detector having a vibrating system including provision for heating the portion of the vibrating element exposed to the possible formation of ice to selectively melt the ice from the vibrating element.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The present invention includes an elongated member having a portion thereof exposed to the ambient atmosphere and the remainder of the length enclosed. This member is supported adjacent its midpoint and made to vibrate at its resonant frequency about a node at the midpoint of its length. This induces vibrations 180° out of phase in the two halves. When ice deposits on all or part of the exposed parts, the mass thereof is increased and this changes the resonant frequency of the respective half length of the member and hence of the system. By utilizing a feed back power input the system will be caused to vibrate at the changed resonant frequency occasioned by the ice load deposited on the exposed portion. The change in frequency can be sensed by a warning instrument which indicates the presence of ice.

In the present invention the exposed end of the oscillating member itself serves as the ice collector, thus improving the sensitivity of the system. This is in contrast to prior art devices, for example, U.S. Patent 2,800,647 to Baerwald which shows a piezoelectric device on the same side of the node point as the ice collector and teaches that a second oscillator is required to provide a reference frequency so that the frequency change due to icing may be detected.

Further, with the present invention there is provided mechanism for de-icing the elongated member very quickly and efficiently with no substantial reduction in the sensitivity of the system. In this way an airplane pilot, for example, may quickly ascertain when icing conditions commence and cease. In addition, the present invention provides means for a continuous icing and de-icing cycle.

The time required to build up sufficient ice to commence the de-icing cycle, and the time required to de-ice are both functions of the icing rate. Thus sensing means may be employed in the present invention to measure the icing rate. This is in contrast to, for example, Baerwald which contains no disclosure relative to de-icing the ice within, and which can not be efficiently and quickly de-iced in the environment of use without substantially lowering the sensitivity of the system.

The invention is illustrated with reference to the drawings, wherein;

FIG. 1 is a longitudinal sectional view through the apparatus of the first embodiment of the invention and shows a wiring diagram of the invention;

FIG. 2 is a view similar to FIG. 1 showing a second embodiment of the invention;

Figure 3:
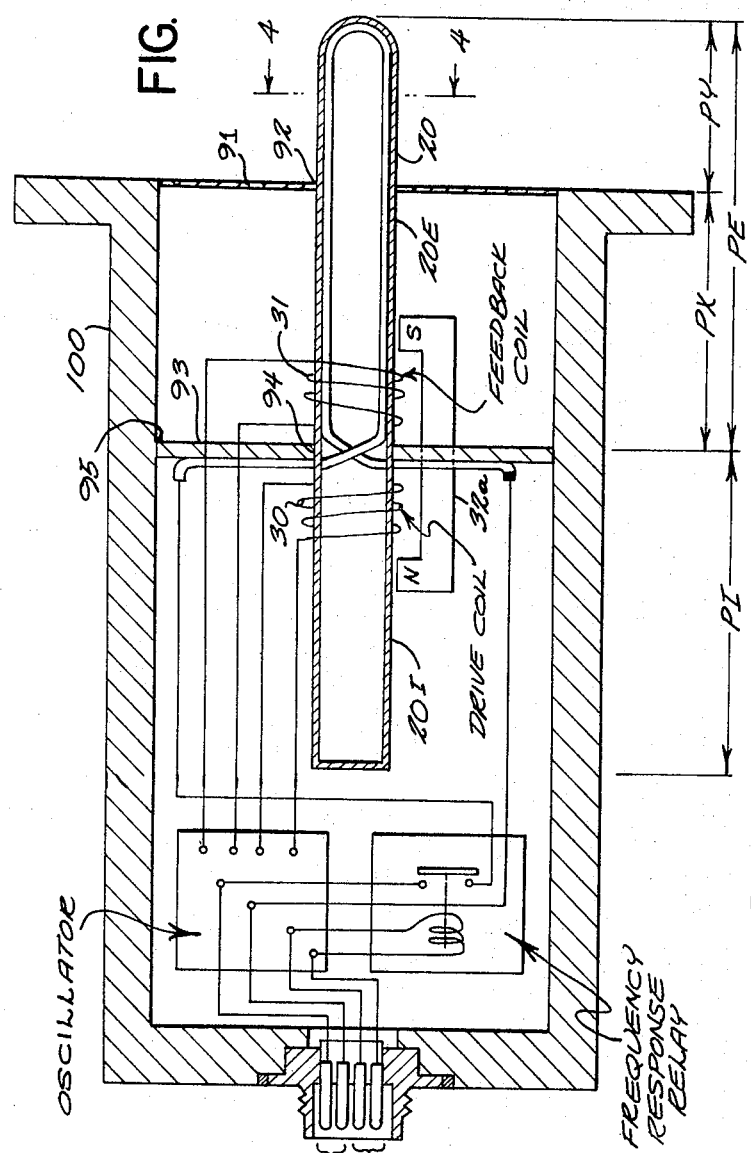
FIG. 3 is a view similar to FIG. 1 of the third embodiment of the invention.

Referring to FIG. 1 the ice detector of the first embodiment includes a case generally designated 10, which typically can be a pressure-tight, round metal case having a mounting flange 11. The case has a rear wall 12 with a central aperture at 14, so as to receive a pressure-tight, multiple contact, electrical connector generally designated 15, which is hermetically sealed to the rear wall 12 of the case at 16 as by brazing or soldering. The front wall 17 of the case, which serves as a nodal support, is made relatively thin so as to be slightly flexible, and at its outer periphery is joined to flange 11. A central aperture 18 is provided in the front wall and through said aperture, there extends an element that may be vibrated such as a small metal tube that typically may have a front rounded outer end 21 and a flat rear end 22. The tube 20 is hermetically sealed to the front wall 17 by being brazed or welded at 24 to the edge of the front wall forming aperture 18. The nodal support 17 thus provides the sole support for the tube.

The tube 20 is mounted so that its attachment at 24 to the aperture 18 divides the length of the tube into a front or exterior portion 20E, which projects outwardly of the case from the nodal support 17 and a rear or interior portion 20I which is situated within the case 10. The lengths of the exterior and interior portions of the tube 20 are respectively designated by the dimensions PE and PI, which dimensions need not be equal. It is essential that the point of attachment 24 of the nodal support 17 to tube 20 be at a node of vibration which occurs on tube 20.

In the first embodiment, the tube 20 is mounted substantially normal to the nodal support 17, and the length of the exterior portion 20E is made substantially equal to the length of the interior portion 20I. The reason for this is that the axial node of vibration of tube 20 typically will occur at about its midpoint, i.e., at the centerline CL. Dimensions PE and PI are measured from the extreme ends 21 and 22 respectively, of the tube 20, to the centerline CL.

A vibrator drive system is provided to vibrate the tube 20. Many different systems may be employed, but magnetostrictive drive systems are particularly desirable. One such system is shown in FIG. 1. Within the case 10, and surrounding but spaced from the interior portion of the tube 20I, there are provided an electrical drive coil 30 and feed back coil 31 which are supported by means, not shown, from the interior of the case 10. Bridging these coils there is provided a magnet 32 having poles N and S closely adjacent the tube 20. This magnet can, if desired, be made in the form of an open ended tube set coaxially around tube 20. Such a tubular magnet can have inturned ends forming the poles N and S, and can enclose and support the coils (energy coupling elements) 30 and 31 which are spaced axially between the poles of the magnet, as illustrated. The magnet as shown is a permanent magnet, though an electromagnet may also be employed for this purpose.

At 40 there is generally designated an oscillator of known design having output terminals 41 and 42 connected by lines 44 and 45 to the drive coil 30. This oscillator, which can be a standard feed-back oscillator, also has terminals 46 and 47 which are connected by lines 48 and 49 to the feed-back coil 31 which senses the vibration of the tube 20. The oscillator 40 is also provided with power supply terminals 50 and 51 connected by lines 52 and 53 to the pins 54 and 55 of the pressure-tight multiple circuit connector 15. These pins 54 and 55 are connected by an external cable to a suitable power supply PS.

The oscillator 40 also has frequency output signal terminals 56 and 57 which are connected through lines 58 and 59 to the pins 60 and 61 of the connector 15 which extend through an external circuit to a frequency indicator FI, by means of which the frequency of oscillation of the oscillator 40 may be read out when desired. Also, within the case 10, there is provided a frequency responsive relay generally designated 70, having a coil 71 connected via lines 72 and 73 to the frequency output signal terminals 56 and 57 of the oscillator 40. The relay 70 has contacts 74 and 75 which are closed by the normally open movable contact 76. When the frequency of the signal is at a predetermined value occurring during no-icing conditions, the relay 70 is open, but when the frequency shifts from such value, relay 70 closes.

While a direct indication of icing in response to frequency change can be obtained with the invention, an even more sensitive resolution can be obtained by employing a second, reference oscillator. The frequency difference between the two oscillators is applied to a detector which operates the alarm. The reference oscillator is mounted entirely within the housing, but near the external surface. When ambient conditions such as temperature cause a change in the resonant frequency of the sensing oscillator, they cause a corresponding change in the resonant frequency of the reference oscillator. Thus, the system is temperature compensated, and very thin ice deposits may be detected.

The exterior portion 20E of the tube 20 is arranged to be de-iced by means of a heater generally designated 80 located on the interior surface of the tube. This heater 80 is in the form of a heater wire which is covered by insulation and enclosed in a sheath. The sheath may be plastic, but is preferably of metal. The sheath of the heater is completely insulated from the heater wire. Where the sheath is of non-metallic material it can be fastened to the surface of the tube by means of temperature resistant cement. Where the sheath is of metal, it can conveniently be attached to the tube by means of brazing or silver-soldering. In the illustration, the heater 80 has an insulated terminal 80A at one end, through which a lead wire 78 extends to the actual heater element, not illustrated, within the sheath. The lead in portion 80B of the sheath is laid against the interior surface of the nodal support 17, and may be attached thereto when nodal support 17 is to be heated, and it may be spiraled around the nodal support 17 or otherwise spread so as to distribute its heat output where desired, against the interior surface of the wall. The heater elements then extend through an aperture in the tube 20 and into the interior of the tube, against the wall of tube 20 at 80C, to the outer or front end 21 of the tube, thence returning at 80D, next out through another aperture in the tube wall of tube 20, and then out along 80E adjacent the interior surface of the nodal support 17 to its insulated terminal 80F. The circuit for the heater is from power terminal 50, line 77, relay contacts 74–76–75, line 78, thence through heater 80 and via line 79 to power terminal 51. Hence, whenever relay 70 is energized contact 76 will close the circuit at 74–75 and heater 80 is energized. The portion of the heater at 80C can, if desired, be laid in a spiral pattern from the position where it enters the tube, adjacent nodal support 17, out to the end 21 and then can be spiraled back at 80D to where it leaves tube 20. A spiral lay of the heater 80, fastened in place by thermal conductive braze or weld will more evenly distribute the heat to the inside surface of portion 20E of the tube.

The tube 20 is illustrated as being resonantly oscillated axially and a node will thus occur at the central part of the tube where a plane at CL would intersect the tube. The wall 17 is the only support for the tube 20, and for the illustrated embodiment, is positioned midway, between the ends of the tube, at such a node of resonant vibration of the tube. Accordingly, there is substantially no movement of the tube 20 relative to wall 17 at its place of attachment thereto. Theoretically, the tube will vibrate and move throughout every portion of its length except at the node, which in this illustration is where a plane at center line CL would intersect the tube. Since the wall 17 does have finite thickness, a slight energy loss will occur at the point of attachment, but this is not sufficiently large to be significant.

The tube 20 is made of magnetic material and can be of nickel, stainless steel or various nickel-containing alloys. A particularly desirable material is the new nickel-iron alloy sold under the trade name "NI-Span-C." This alloy contains about 42% nickel, 5% chromium, 2.5% titanium, and the balance is iron. All of these materials are magnetic and are adaptable to magnetostrictive vibratory excitation.

An advantage in using the alloy "NI-Span-C" for the tube is that when appropriately heat treated by known procedures, this alloy has a negligible change of stiffness with variations in temperature. More exactly, when appropriately heat treated, this alloy has only a negligible temperature coefficient of Young's modulus and the frequency, therefore, does not change significantly when the temperature varies incidentally to heat being supplied to portion 20E of the tube, for de-icing. When other materials are used, there will be a slight change in Young's modulus when the temperature changes. While such change can be compensated or recognized, the necessity for so doing is reduced or, in many instances, completely avoided, by using the stated alloy. However, when using a nickel tube, where a slight change in stiffness does occur when heated, the results are quite satisfactory, even without compensation. The frequency change due solely to temperature change is very small, and in any event, may easily be recognized and differentiated from frequency change due to an ice load on portion 20E of tube 20.

In FIG. 2, the device of the second embodiment is identical with that of FIG. 1 except that connector 15 has six pin connectors for handling six lines. This permits a line 86 to be added from junction 87 on line 78 and a line 88 to be added from junction 89 on line 79. Line 86 extends through pin 84 and line 88 extends through pin 85. Externally, line 90 from pins 84 and 85 extend to a "Heater On" indicator H, which is energized whenever the heater 80 is energized.

While the magnetostrictive mode of imposing an oscillation on tube 20 has been illustrated, it will be understood that other vibratory systems may be used, such as a piezoelectric drive system. The magnetostriction drive system is preferred in most designs, but the piezoelectric drive system is also entirely feasible and is understood to be within the purview of the invention.

According to the first and second embodiments of the present invention the tube 20 vibrates axially as denoted by the arrows 81 for the front portion 20E and 82 for the interior rear portion 20I. This system of vibration of the present invention, may be considered as two separate axial vibrating systems, the one (for portion 20E of the tube) being outside the metal case 10 and the other (for portion 20I of the tube) being inside the metal case 10. So long as the two portions 20E and 20I have substantially the same resonant frequency, the nodal point of the vibration of the tube will be at the centerline CL of the nodal support 17. As a consequence, substantially no motion of the nodal support 17 is required in order to couple the mechanically vibrating portions 20E and 20I to each other. This results from the fact that the amplitude of vibration in the vicinity of the mounting is negligible and only a slight motion of the nodal support 17 is sufficient to transmit the vibration from one side to the other of the plate, and consequently from the rear end 22 to the outer end 21 of the tube 20.

In FIG. 3 a third embodiment of this invention is shown. The tube 20 is again supported only at its node-point by the nodal support 93, which is joined to casing 100 at its circumferential edge at 95. The nodal support 93 is welded or brazed to the tube 20 at the node-point 94. In this embodiment however, the feedback coil 31 is placed on the intermediate portion, indicated by PX, of the tube 20. As may be noted from FIG. 3, portion PX is located on the opposite side of the nodal support 93 from portion 20I but is located within the confine of casing 100.

The tube front portion 20E extends axially forwardly of the casing 100 a substantial distance as indicated by dimension PY. A thin, flat, circular, protective metal membrane 91 is provided at the front of the casing 100 through which the tube extends axially forwardly of the casing; membrane 91 being brazed to the casing 100. The membrane 91 is located to adequately clear the coil 31, tubular position PY being located without the thus enclosed casing 100, and the tubular portion PX having coil 31 therein located within the enclosure 91, 100. Thus, contrasting the first and second embodiments to the third embodiment, the entire vibratory member 20 and coil assembly is moved so that instead of the nodal support being located in the plane of the housing front, the membrane 91 is. Also the magnet 32a (same as 32 of FIGURES 1 and 2) is moved so as to extend through the support 93 such as indicated in FIGURE 3.

Since membrane 91 is brazed to the housing 100 and to the tube 20 at the junction of portions PX and PY, there is provided a weatherproof seal without interfering substantially with the performance of element 20; portion PY being exposed to the ambient atmosphere.

This protective membrane 91 is designed ideally to provide no resistance to the vibration of tube 20, and no support for the tube. In practice, the protective membrane 91 is a thin metal sheet welded or brazed at the seal 92. This sheet will provide a very slight resistance to vibration, and very slight unintentional support. It has been found that a stainless steel sheet 0.003 inch thick brazed to tube 20 at the seal 92 is satisfactory as a protective membrane.

Positioning the feedback coil 31 on portion PX provides a much more efficient drive to the vibratory tube 20 and provides a more sensitive response to changes of vibration in portion 20E (indicated by dimension PE in FIG. 3) than that obtained with the first and second embodiment. At the same time, coil 31 of the third embodiment is protected from ambient atmospheric environmental conditions even though it is located on the opposite side of the nodal support from coil 30. To be mentioned is that the positions of coils 30, 31 of FIGURE 3 would be interchanged without seriously affecting the performance of the unit.

Figure 4:
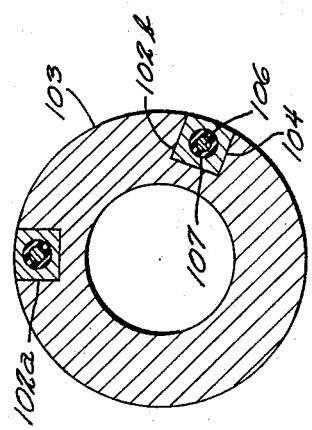
FIG. 4 is an enclosed cross-sectional view of a further modified form of the invention which corresponds to a view generally taken along the line and in the direction of the arrows 4—4 of FIG. 3 to show a manner of mounting the heater element flush with the surface of the vibratory tube.

Referring to FIG. 4 there is in part illustrated a further modification of the invention. The ice detector of the embodiment of FIG. 4 may be the same as that described with reference to any one of FIGS. 1 to 3. Instead of the heater element being located to extend within the inner peripheral portion of the vibratory tube, an elongated slot, having slot portions 102a and 102b is cut in the outer circumferential portion of the tube 103 and extends forwardly from the nodal support. Slot portions 102a and 102b are joined by a slot portion (not shown) cut in the forward end of the tube. Located within the slot to fill the slot is a heater jacket 104 that is flush with the outer surface of the tube 103. Located within the jacket 104 is the resistance wire 106 and its insulation 107. Desirably, the jacket is made of the same material as the tube and thus has the same characteristics as the vibratory tube. This minimizes the foreign material added to the vibratory tube.

There are several beneficial results from this invention. The nodal support can be made stiff enough and strong enough so as to form the sole support of the vibrating system. Additional supporting devices are not needed. Accordingly, the tube 20 is entirely supported at the middle of the tube and it is completely free from supports elsewhere, except for the incidental support given by the protective membrane shown in FIG. 3. Another advantage is that the entire drive system is inside the enclosure 10 or 100 where it is completely protected from the exterior environment. The interior of the case 10 or 100 can be evacuated, if desired, or filled with a neutral gas. Another advantage is that structural vibration entering the system via the mounting flange 11 and case 10 or 100 are very effectively prevented from exciting significant vibrations in the tube 20. This results from the fact that in the desired vibration, axially of the tube as denoted by arrows 81 and 82, the two parts of the system move out of phase with each other. Stated another way, when the front portion 20E is compressing, and its outer end 21 is moving toward the nodal support 17, 93 the interior portion 20I of the tube will also be compressing and its rear end 22 will also be moving toward the nodal support 17, 93. Then, as the wave of compression reaches its crest, so that the dimensions PE and PI are simultaneously reduced as much as the stiffness of the tube will permit, the end 21 and 22 will simultaneously begin to move outwardly from the nodal support 17, 93. The two portions 20E and 20I of the tube will then be moving in directions opposite from each other. Accordingly, the two parts 20E and 20I of the system always move in directions which are either towards each other or away from each other, i.e., the two portions vibrate "out-of-phase" with each other. Now, any vibration entering the system via the mounting flange 11 and nodal support 17 or 93 will tend to vibrate the case 10 or 100 and everything attached to it, and will tend to move the two portions 20E and 20I of the vibrating element 20 in directions which are "in-phase" with each other. These extraneously imposed "in-phase" vibrations do not produce a nodal point at the middle of the tube, and hence the "in-phase" vibrations are difficult to excite and difficult to maintain, because they are not at a resonant frequency for the vibrating system of the tube 20.

The vibrating system of the tube 20 need not operate at the lowest resonant frequency, but it is usually best to do so. Furthermore, the resonant frequency can be the lowest possible frequency for one portion of the vibrating system (say the front portion 20E) and may be the next-to-lowest resonant frequency, or an even higher resonant frequency for the other side (say the interior portion 20I), so long as the node remains at a certain position.

There is no particular restriction as to mass or stiffness, of one side 20E of the system as compared to the other side 20I. It is only required that they have approximately the same resonant frequency. The result of slightly different resonant frequencies for the two sides is that the nodal position tends to shift from the centerline CL of the flexible plate in one direction or the other. If there is a very significant shift of the nodal position from the immediate vicinity of the nodal support 17 or 93, then the stiffness of the plate is sufficient to prevent effective coupling of the vibration from one side of the system to the other. In such event, the resonance becomes more difficult to excite and the system becomes more sensitive to external structural vibrations.

In the illustrated embodiments the rate of vibration is from 20 to 40 kilocycles per second and a typical deposit of ice 0.05 inch on one side of front portion 20E of the tube 20 will cause a frequency shift of about 2%. In such typical embodiment, the tube 20 is nickel and has a diameter of 0.250 inch and dimension PE is 1.125 inch.

In the illustrated embodiments, the heating element 80 is attached in place by a heat communicating fastening such as brazing. Consequently the heater element 80 is integrally attached as a part of the portion 20E of the tube, and hence participates in the vibration. In order to improve the response of the system the heater sheath may be made of a material with the same resonant frequency as the tube material as described with reference to FIG. 4.

In operation, the system involves oscillation at the resonant frequency. When a layer of ice collects on the exterior portion of the tube, mass is added to such portion. This results in a reduction in resonant frequency for the system. If one considers the two portions 20E and 20I as two cooperating vibrating systems, the effect of ice on the exterior portion 20E of the tube will be to reduce the resonant frequency for such exterior portion and shift the node slightly toward the inner vibrating system composed of interior portion 20I of the tube. This results in a reduction in the resonant frequency.

In practice, it is sometimes desirable to shield the nodal support 17 by an external shield to prevent deposition of significant amounts of ice thereon. Such a shield (not shown) would, of course, be interrupted around tube 20. Also, in the usual mounting the portion 20E of the tube is projected transversely to the direction of motion of the entire vehicle, and consequently there is little opportunity in most instances for ice to deposit directly upon the nodal support 17. What does deposit, can be melted off.

Various electronic circuit arrangements, of which one is shown, may be used for establishing oscillation. The oscillator 40 is of standard design and utilizes the feed back voltage produced by coil 31 for controlling the oscillation.

The frequency change incident to collection of ice along the portion 20E of the tube, is supplied at terminals 56 and 57, which extend to the external circuit at pins 60 and 61. Any known form of frequency indicating instrument may be used in the external circuits for sensing or indicating the frequency or change of frequency. In the illustrated form of the invention, the frequency responsive relay 70 is shown schematically. This relay 70 is of known type and is normally open, but it closes when the frequency changes from a predetermined amount due to ice accumulating on the tube 20E. When this occurs, coil 71 will cause closure of movable contact 76, thereby establishing a circuit through the heater 80. In FIGURE 2, a circuit is established to external "Heater On" indicator H. When the heater is thus energized, the heat input will melt off the ice and the resonant frequency returns to normal. When this occurs, the relay 70 de-energizes, and the heater element 80 is no longer energized, and cools off. The power to the de-icing heater 80 is, therefore, turned on and off automatically in response to the change in frequency. If icing persists, and if further accumulation of ice occurs on portion 20E of the tube, the relay 70 will be energized repeatedly and the rate of frequency at which the heater 80 is energized is itself an indication of the rate of accumulation of ice on portion 20E. The entire instrument thus can also be used as an "icing-rate" sensor. While, for most purposes, it is sufficient merely to know that icing exists, in some instances, the rate of icing is also important, and therefore, the frequency of energization of the heater element 80 which is evident every time the relay 70 closes, is an indication of the rate of icing. The amount of frequency change is an indication of the amount of ice built up on the portion 20E.

If the vibration drive circuit is made sufficiently powerful to permit oscillation under reasonably heavy ice loads, the intense vibration causes the vibration element to warm up due to its own internal friction. This warming could keep the tube free from ice in some icing situations. To prevent this, an automatic power control circuit is employed to sense the feedback coil voltage, and to reduce the power to the driving coil when the feedback coil voltage is excessive. When the feedback coil voltage is low, power is increased.

This phenomenon can be used to replace the heater to de-ice the tube. When it is desired to de-ice the tube, power to the drive coil is increased. When it is desired to permit icing, power is decreased. Purely as a protective feature, a failure signal may be added to provide an alarm if the oscillation stops. Failure of the circuit, or unusually heavy slush may stop vibration of the vibratory element 20. Such failure signal would result in an alarm being given until oscillation resumes.

As many apparently different embodiments of this invention may be made without departing from the spirit and scope thereof, it is to be understood that we do not limit ourselves to the specific embodiments disclosed herein.

What is claimed is:

1. An ice detector comprising a nodal support forming a dividing surface, a vibrating element having a node of vibration when it is resonately vibrated, the nodal support being attached to said vibrating element substantially at said node of vibration and forming at least substantially the entire support of said vibrating element, said vibrating element having rear and front portions, each portion extending away from said nodal support, said element being capable of being located by said support with at least a part of the front portion positioned in a zone wherein ice may accumulate thereon, vibrating means mounted adjacent the rear portion for exciting the vibrating element into resonant vibration, and means for sensing a shift of the resonant frequency of vibration of said vibrating element resulting from a change of mass of said vibrating element due to ice accumulating thereon.

2. The apparatus of claim 1 further characterized in that said vibrating element is of elongated cylindrical shape and extends through the nodal support and substantially normal thereto.

3. The apparatus of claim 1 further characterized in that said nodal support is flexible.

4. The apparatus of claim 1 further characterized in that said vibrating element is a hollow tube closed at its forward ends.

5. The apparatus of claim 1 further characterized in that the vibrating means is located adjacent the rear portion and that there is provided a housing connected to said nodal support so as to completely enclose said rear portion and vibration means.

6. An ice detector comprising a nodal support, an elongated vibrating element having a node of vibration when it is resonately vibrated and an axis of elongation, said nodal support being attached to said vibrating element substantially at said node of vibration thereof, so as to define front and rear portions thereof, said vibrating element being supportable by the nodal support so as to have at least the forward part of the front portion in an icing environment, vibrating means mounted adjacent said vibrating element for exciting the whole element into resonant vibration, sensing means mounted adjacent said vibrating element for sensing the response of said vibrating element which results from the excitation of said element by said vibrating means, and heater means on at least the front portion of said vibrating element which is exposable to an icing environment.

7. The apparatus of claim 6 further characterized in that said vibrating means drives the said vibrating element in response to a signal from said sensing means.

8. The apparatus of claim 6 further characterized in that the vibrating element is tubular and is axially vibrated.

9. The apparatus of claim 6 further characterized in that the vibrating element is magnetic and the vibration means is associated therewith so as to vibrate said element magnetostrictively.

10. The apparatus of claim 6 further characterized in that the vibrating element is vibrated at a frequency from about 20 to about 40 kilocycles per second.

11. The apparatus of claim 6 further characterized in that there is provided a housing that mounts said nodal support said nodal support and said housing being joined to form an enclosure and that the vibrating means and sensing means include axially spaced energy coupling elements adjacent said vibrating element and on the same side of the nodal support.

12. The apparatus of claim 6 further characterized in that said sensing means includes an energy coupling element mounted adjacent the front portion of said vibrating element and on the same side of said vibrating element as said front portion.

13. The apparatus of claim 12 further characterized in that there is provided a housing mounting the nodal support with said rear portion in the interior of said housing and that a protective membrane is mounted adjacent the front portion of said vibrating element forwardly of said energy coupling element to in conjunction with said housing form an enclosure for said coupling element.

14. The apparatus of claim 6 further characterized in that said nodal support is a flexible plate and said vibrating element has a generally cylindrical exterior surface, and extends through said support so as to have a portion of its length on each side of the support.

15. The apparatus of claim 14 further characterized in that said vibration is axial.

16. The apparatus of claim 14 further characterized in that said vibrating element is a tube closed at the forward end of the front portion.

17. The apparatus of claim 14 further characterized in that said vibrating element is a tube closed at the forward end of the front portion and that the heater means includes a heater element attached in heat conductive relation to the interior surface of the front portion thereof.

18. The apparatus of claim 14 further characterized in that said vibrating element is a tube closed at the forward end of the front portion, said front portion having an exterior groove, and that said heater means includes a heating element mounted in said groove.

19. The apparatus of claim 14 further characterized in that said flexible plate is located within and intermediate opposite ends of said housing and abuts against said housing, and that there is provided a thin membrane joined to the forward end of housing and to said vibrating element without providing any substantial support for said element to provide an enclosure, said front portion in part extending outwardly of said housing beyond said membrane, and said sensing means including an energy coupling element located between said flexible plate and said membrane.

20. The apparatus of claim 14 further characterized in that said housing and said nodal support are joined to provide a hermetically sealed enclosure.

21. The apparatus of claim 14 further characterized in that there is provided a housing having a hollow interior, closed at one end and having said flexible plate joined to said housing at its peripheral edge and located substantially spaced from said one end, said rear portion being located between said plate and one end.

22. The apparatus of claim 21 further characterized in that said vibrating means is at least in part positioned within the housing, and that said part of the vibrating means within the housing is only located between said plate and said one end of said housing.

23. An ice detector comprising a nodal support forming a dividing surface, a tubular vibrating element having a node of vibration when it is resonately vibrated, said nodal support being attached to said vibrating element substantially at said node of vibration, said vibrating element having rear and front portions, each portion extending away from said nodal support, said element being capable of being located by said support with at least a part of the front portion positioned in a zone wherein ice may accumulate thereon, vibrating means mounted adjacent the rear portion for exciting the vibrating element in a non-icing condition into resonant vibration at a predetermined frequency, and means for sensing the change of resonant frequency of vibration of said vibrating element from the predetermined frequency to another resonant frequency of vibration resulting from a change of mass of said vibrating element due to ice accumulating on said part of the front portion.

24. An ice detector comprising a housing having a closed end and an open end, an elongated vibrating element having a node of vibration when it is resonately vibrated, a nodal support attached to said vibrating element substantially at said node of vibration so as to define front and rear portions thereof, and joined to said housing to form a first enclosure between said closed end and said nodal support, a thin membrane joined to the open end of the housing and to said vibrating element without providing any substantial support for said vibrating element to provide a second enclosure between said nodal support and said membrane, said vibrating element being supported by said nodal support so as to have at least the forward part of the front portion extend outwardly of said housing into an icing environment and the rear portion within said first enclosure, vibrating and sensing means mounted adjacent said vibrating element for exciting the whole vibrating element into resonant vibration and to sense the vibration of said vibrating element in response to the excitation thereof, the last mentioned means including axially spaced energy coupling elements mounted axially between said closed end and said membrane, and adjacent said vibrating element.

25. The apparatus of claim 24 further characterized in that one of said coupling elements is mounted in the first enclosure and the other in the second enclosure.

26. The apparatus of claim 24 further characterized in that said nodal support comprises a flexible plate having its peripheral edges joined to said housing.

References Cited

UNITED STATES PATENTS

| | | | |
|---|---|---|---|
| 2,789,281 | 4/1957 | Short et al. | 244—134 XR |
| 2,990,482 | 6/1961 | Kenny. | |
| 3,100,390 | 8/1963 | Banks | 73—67.1 XR |
| 3,229,523 | 1/1966 | Boyd et al. | 73—290 |

LOUIS R. PRINCE, *Primary Examiner.*

J. NOLTON, *Assistant Examiner.*